US008690666B2

(12) United States Patent
Nathanson (10) Patent No.: US 8,690,666 B2
(45) Date of Patent: Apr. 8, 2014

(54) SYSTEMS AND METHODS FOR DATA VALUATION

(75) Inventor: David Jaeger Nathanson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 69 days.

(21) Appl. No.: 13/346,570

(22) Filed: Jan. 9, 2012

(65) Prior Publication Data

US 2012/0190432 A1  Jul. 26, 2012

Related U.S. Application Data

(60) Provisional application No. 61/435,413, filed on Jan. 24, 2011.

(51) Int. Cl.
*A63F 13/00* (2006.01)

(52) U.S. Cl.
USPC .................. 463/25; 463/17; 463/29; 463/42

(58) Field of Classification Search
USPC .......................................... 463/17, 25, 29, 42
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |

(Continued)

*Primary Examiner* — James S McClellan
(74) *Attorney, Agent, or Firm* — Ingrassia Fisher & Lorenz, P.C.

(57) ABSTRACT

A computer-implemented valuation method is provided for a data field of a data object. The method includes receiving a proposed wager from a first user with a predicted future value of the data field at an evaluation condition; receiving a counter-wager from a second user against the predicted future value; monitoring the evaluation condition; and upon satisfaction of the evaluation condition, determining a current value of the data field, comparing the current value to the predicted future value, and declaring a winning party between the first user and the second user based on the comparison.

19 Claims, 10 Drawing Sheets

(56) References Cited

U.S. PATENT DOCUMENTS

| | | |
|---|---|---|
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven, Deceased et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0155885 A1* | 10/2002 | Shvili ............... 463/25 |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015429 A1* | 1/2004 | Tighe et al. ............ 705/37 |
| 2004/0015981 A1 | 1/2004 | Coker et al. |
| 2004/0027388 A1 | 2/2004 | Berg et al. |
| 2004/0058731 A1* | 3/2004 | Rossides ............... 463/42 |
| 2004/0063484 A1* | 4/2004 | Dreaper et al. ......... 463/16 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2011/0055223 A1* | 3/2011 | Elmore et al. ......... 707/748 |

\* cited by examiner

SYSTEMS AND METHODS FOR DATA VALUATION

CROSS-REFERENCE TO RELATED APPLICATION

This application claims the benefit of U.S. provisional patent application Ser. No. 61/435,413, filed Jan. 24, 2011, the entire content of which is incorporated by reference herein.

TECHNICAL FIELD

Embodiments of the subject matter described herein relate generally to data processing systems and methods, such as systems and methods for data valuation that may be used in a multi-tenant database environment or the like.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware. A customer relationship management (CRM) system is one example of an application that is suitable for deployment as a cloud-based service.

As another example, cloud-based service may provide a platform for users of a community, such as a place of work, to communicate with one another and otherwise share information. The cloud-based service and the administrators of the community are continuously attempting to increase the user participation and utility of these systems.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Broadly, exemplary embodiments discussed herein provide improved valuation systems and methods for data stored in multi-tenant database environment. In one exemplary embodiment, a valuation system enables a user to propose a wager by predicting the future value or otherwise unknown value of a data field associated with a data object. Another user may accept the proposed wager to form a completed wager, or the system itself may accept the proposed wager to form a completed wager. The valuation system monitors an evaluation condition of the completed wager. When the evaluation condition is satisfied, the valuation system retrieves the current value of the data field, compares the current or actual value to the predicted value, and declares a winner of the wager. The gaming aspect of the wager encourages user participation in the community or the multi-tenant environment and provides information about the perceived value and true value of the data fields.

Figure 1:
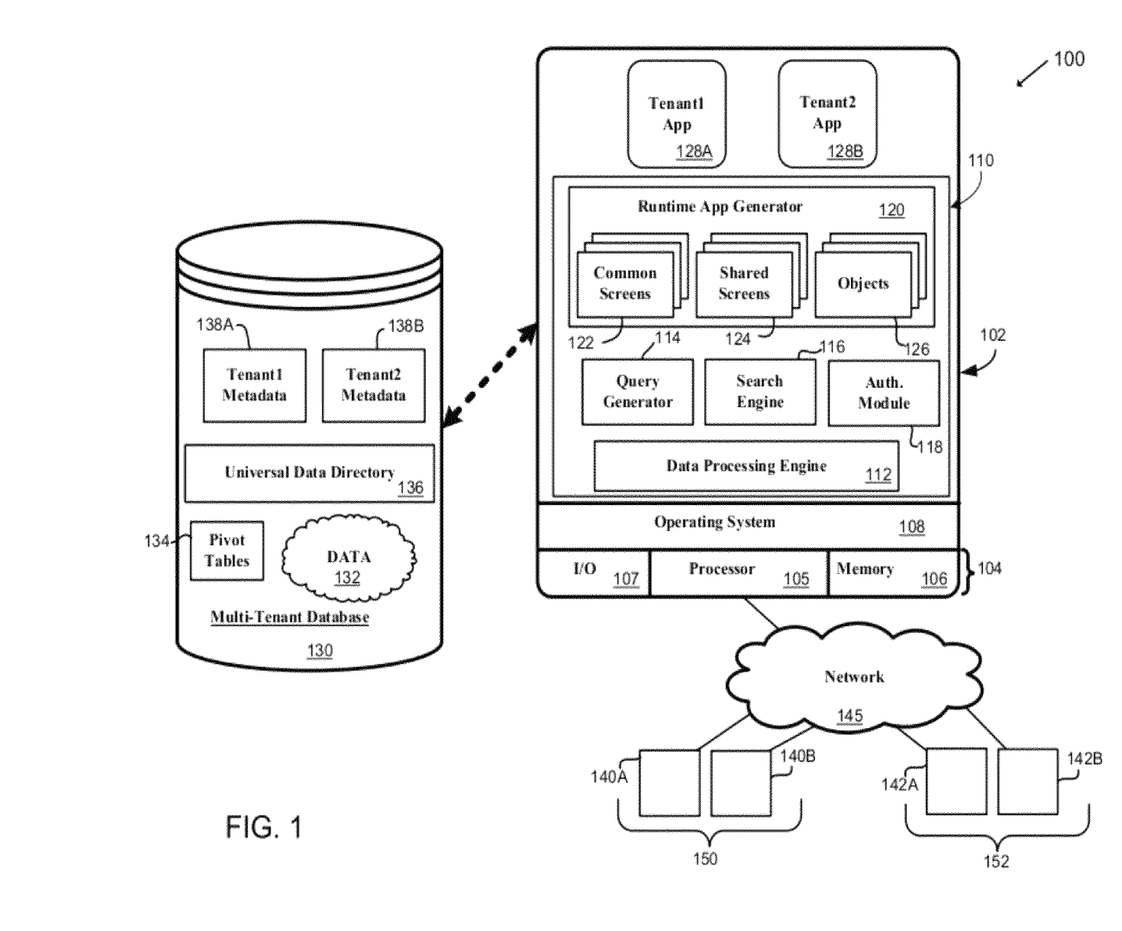
FIG. 1 is a block diagram of a multi-tenant data processing system in accordance with an exemplary embodiment.

FIG. 1 is a block diagram of a multi-tenant data processing system 100 in accordance with an exemplary embodiment. In one exemplary embodiment, the system 100 provides one environment for the valuation systems and methods discussed in greater detail below. The system 100 suitably includes a server 102 that dynamically creates virtual applications 128 based upon data 132 from a common database 130 that is shared between multiple tenants (or clients or users). Data and services generated by the virtual applications 128 are provided via a network 145 to any number of user devices 140 (e.g., user devices 140A and 140B) and user devices 142 (e.g., user devices 142B and 142B), as desired. Each virtual application 128 (e.g., virtual applications 128A and 128B) is suitably generated at run-time using a common application platform 110 that securely provides access to the data 132 in the database 130 for each of the various tenants subscribing to the system 100. In accordance with one non-limiting example, the system 100 may be implemented in the form of a multi-tenant CRM system that can support any number of authenticated users of multiple tenants.

A "tenant" generally refers to a group of users that share access to common data within the database 130. Tenants may represent customers, customer departments, business or legal organizations, and/or any other entities that maintain data for particular sets of users within the system 100. As an example in the depicted embodiment, user devices 140 are associated with one tenant and user devices 142 are associated with another tenant. As described below, the users within a tenant may be referred to as a tenant community (e.g., community 150 and community 152). Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous heap-type format. The data 132 can then be organized as needed for a particular virtual application 128. As an example, the data 132 in the database 130 can generally be viewed as a collection of data objects, such as a set of logical tables, containing data fitted into predefined categories. Each table or object generally contains one or more data categories logically arranged as columns or fields in a viewable schema. Each row or record of a table contains an instance of data (e.g., a value) for each data field. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the user devices 140 and 142. The virtual applications 128 are typically generated at run-time in response to queries received from the user devices 140 and 142. For the illustrated embodiment, the application platform 110 includes a bulk data processing engine 112, a query generator 114, a search engine 116 that provides text indexing and other search functionality, a user authorization module 118, and a runtime application generator 120. Each of these features may be implemented as a separate process or other module, and many equivalent embodiments could include different and/or additional features, components or other modules as desired.

Upon initial engagement with the application platform 110, the user authorization module 118 prompts and receives identification from the user devices 140 and 142. Such identification may include, for example, user names and passwords such that the user authorization module 118 may authorize or prevent further access by the potential user. For example, the user may authenticate his or her identity to the authorization module 118 to obtain a session identifier that identifies the user in subsequent communications with the server 102.

Upon authentication, the runtime application generator 120 dynamically builds and executes the virtual applications 128 in response to specific requests received from the user devices 140 and 142. The virtual applications 128 created by tenants are typically constructed in accordance with the tenant-specific metadata 138, which describes the particular tables, reports, websites, interfaces and/or other features of the particular application. In various embodiments, each virtual application 128 generates dynamic web content that can be served to a browser or other client program associated with its user device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled user device 140 and 142 on the network 145. Typically, the user operates a conventional browser or other program to contact the server 102 via the network 145 using, for example, the hypertext transport protocol (HTTP) or the like. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional software running on the user device 140 and 142; other embodiments may simply provide dynamic web or other content that can be presented and viewed by the user, as desired.

As noted above, user devices 140 and 142 may be any machine or system that is used by a user to access the system 100. For example, the user devices 140 and 142 may be a handheld computing device, a mobile phone, a laptop computer, a work station, and/or a network of computing devices. As one example, the user devices 140 and 142 may each include a processor system, memory system, and user interfaces that enable the user to interact with system 100. As noted above, the user devices 140 and 142 may include, for example, a browsing program allowing a user to access, process and view information, pages and applications available to it from system 100 over network 145. For example, the user devices 140 and 142 can be used to access and search data and applications hosted by system 100 and otherwise allow a user to interact with various GUI pages that may be presented to a user.

Figure 2:
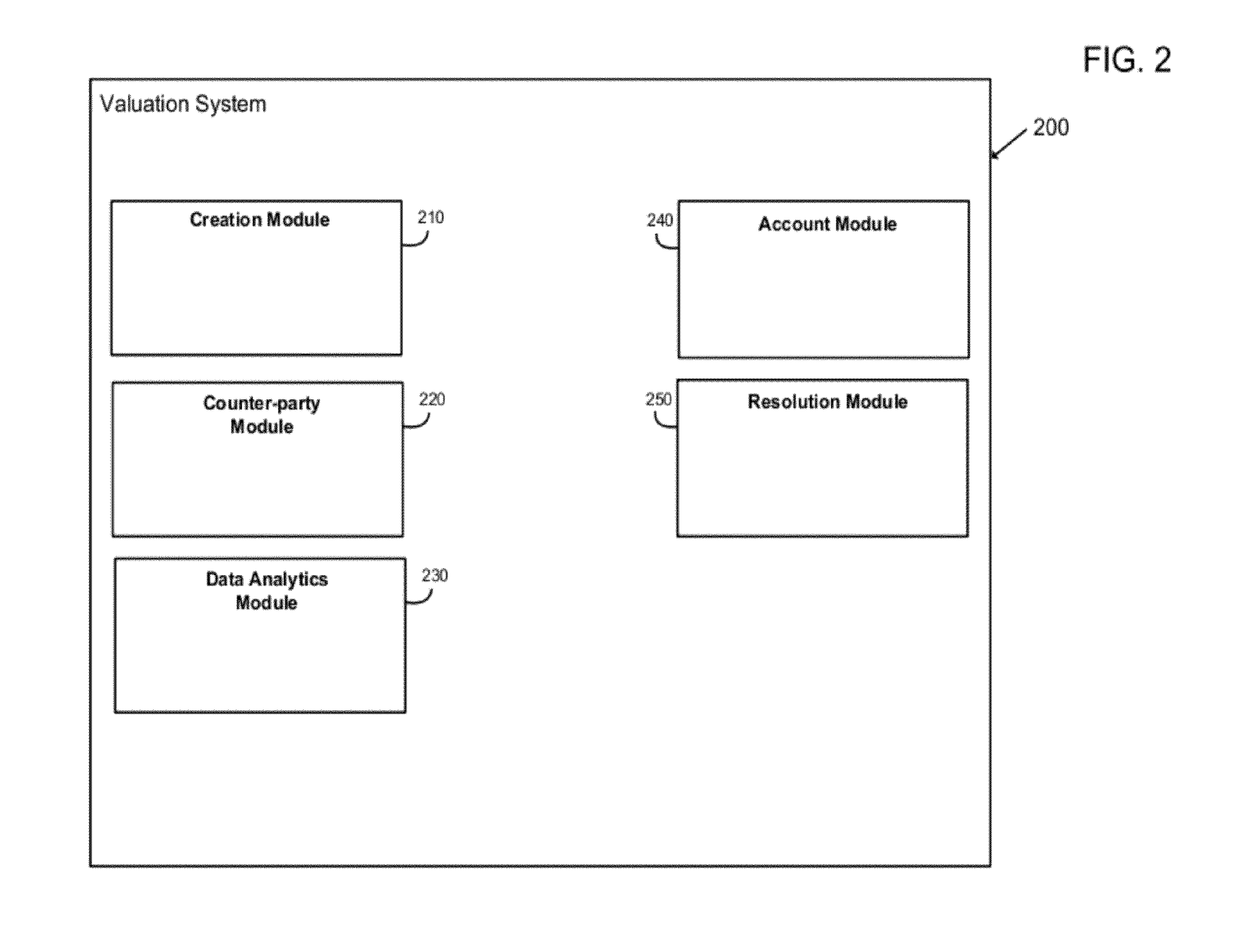
FIG. 2 is a block diagram of a valuation system associated with the multi-tenant data processing system of FIG. 1.

FIG. 2 is a block diagram of a valuation system 200 in accordance with an exemplary embodiment. Although not depicted in FIG. 2, the valuation system 200 could be deployed in the context of a multi-tenant data processing system, such as the system 100, and will be described within the context of the system 100 of FIG. 1. For example, the valuation system 200 may be generated as an application of the tenant applications 128 and accessible to the user devices 140 and 142 through network 145. For example, the valuation system 200 may be part of a service offering (or product) for the system 100 that hosts one or more websites on behalf of tenants (or customers) to provide one or more website communities for their own users. In other embodiments, the valuation system 200 may be used in other contexts, including outside of the multi-tenant database system 100. The data accessed by the valuation system 200 may reside, for example, in the server 102, the database 130, the user devices (e.g., user devices 140 and 142), or an alternate data source.

In general, the valuation system 200 enables users within a community (e.g., community 150 or 152) to propose, evaluate, and resolve wagers about the future value of data fields associated with data objects. A wager may be, for example, the expected value of a data field at some future date or condition, as described in greater detail below. In one exemplary embodiment, the users may be part of the same community, such as an organized group or company, and in other embodiments, the users may be otherwise unrelated.

The illustrated embodiment of the valuation system 200 generally includes, without limitation, a creation module 210, a counter-party module 220, a resolution module 230, an account module 240, and a data analytics module 250. FIG. 2 depicts functional modules that might be realized using, for example, one or more processors, a data processing engine, or other computer-implemented logic resident in or accessible by the system 200. The modules 210, 220, 230, 240, and 250 are operatively associated with one another, and may be coupled together using any suitable interconnection arrangement or architecture that accommodates data communication as needed. The modules 210, 220, 230, 240, and 250 are introduced below and followed by a more detailed example of one implementation.

The creation module 210 generally enables a user to create a proposed wager based on a data field of a data object accessible to the user. In one exemplary embodiment, the data object may be created or viewed by the user. A data object may be considered a collection of data fields that describe attributes of the data object. As an example, a data object may be a contact of the user and the associated data fields may be the name, address, and telephone number of the contact. As another example, the data object may be a Company Profile, and the data fields may include information such as the name, management, number of employees, financial information such as profit and growth, and stock price. As a further example, the data object may be a plant, and the associated data fields may include age, species, location, size, and the like. As yet another example, the data object may be a software issue and the associated data fields may include information such as the identification of the person responsible for resolving the issue, name of the issue, description of the issue, and the filing date of the issue. Generally, any type of data may be represented as a data object with structured data fields. As such, in the multi-tenant system 100 described above, the data objects used by the valuation system 200 correspond to data object accessible by a particular user for a particular tenant, as determined by the user authorization module 118, query generator 114, and tenant-specific metadata 138.

Upon selection of a suitable data object by the user, the creation module 210 may present the user with a group of data fields associated with the selected data object. As described in greater detail below, each data field may have a current value and/or a future value that represents an attribute of the data object. In one exemplary embodiment, the data objects and the associated fields discussed herein are accessible within the database 130 (FIG. 1), although other data sources may be used. Upon presentation of the applicable data fields, the user may select one of the data fields. In one exemplary embodiment, only data fields that are expected to be modified in the future may be selected by the user of the valuation system 200. In other embodiments, users may be restricted from placing wagers on certain data fields and/or data objects. For example, the following exemplary types of restrictions could exist: a user may not place or participate in a wager if the data field is editable by the user in question; or user can't participate in a wager if the data field is editable by a colleague. In other words, the system 200 may particularly be used to predict or value data fields that have an uncertain future value.

In response to the selection of a data field, the creation module 210 generates a prediction entry interface for the selected data object field. In one exemplary embodiment, the prediction entry interface may be a text or dialog box with a number of editable or selectable entries. For example, the prediction entry interface enables a user to enter a predicted value for the selected data field. In various embodiments, the predicted future value refers to an anticipated match of any suitable pattern in the data field and may correspond, for example, to an exact value, a range of values, or a similar qualitative or quantitative value. The prediction entry interface also enables the user to enter an evaluation condition at which the wager will be resolved or otherwise evaluated. For example, the evaluation condition may be a resolution date on which the user expects the prediction to be true. The prediction entry interface may further enable the user to input a wager amount that represents the value or confidence that the user has in the prediction. The wager amount may be in any format, including points, badges, or other indication of merit. The creation module 210 may invoke constraints on any of the entries, including maximum or minimum predicted values, maximum or minimum evaluation conditions, maximum or minimum wager amounts, and wager authorization based on the identity of the user.

Upon user completion of the prediction entry interface, the creation module 210 finalizes the proposed wager. In one exemplary embodiment, upon completion of the wager, a link is placed next to the data field in the display of the data object. When the user clicks on that link, the link passes along information about the field as a link parameter (e.g., a URL parameter), including the unique ID of the data object and the name of the field. The unique identity of the data object field is saved with the completed wager. The creation module 210 may also suitably format and display the proposed wager to other users or the community.

The counter-party module 220 enables another user (referred to as a second user or counter-party) to review the proposed wager, and if desired, accept the proposed wager of the user. In particular, the proposed wager displayed by the creation module 210 may include information about the wager, including the identification of the data object and the data field, the evaluation condition, and the wager amount. The displayed representation of the proposed wager may further include a link or selection that enables the second user to accept the proposed wager, thus creating a completing wager. Upon acceptance by the counter-party, the counter-party module 220 saves the completed wager. The counter-party module 220 may further notify the first user about the completed wager and display the completed wager to the first user, the second user, and other members of the community in, for example, the original data object display/page, the news feed, email, SMS, and the like. In some embodiments, only a single user can wager against the first user (e.g., only the second user can accept the proposed wager). However, in other embodiments, any number or a limited number selected by the first user may accept the proposed wager to create multiple completed wagers. In other embodiments, the counter-party module 220 may be omitted and/or the system 100 may accept the proposed wager to complete the wager instead of another user.

The resolution module 230 receives the completed wager and evaluates the condition associated with the completed wager. As discussed above, the evaluation condition may be an agreed-upon event at which time the wager will be resolved, such as a specified date. If the evaluation condition is not satisfied, the resolution module 230 does not resolve the completed wager and continues to monitor the evaluation condition. When the evaluation condition is satisfied, the resolution module 230 retrieves the data object subject to the completed wager and evaluates the predicted data field. In one exemplary embodiment, the resolution module 230 will initiate a data query with the query generator 114 to retrieve the current value of the data field stored as part of the data object in database 130. In one exemplary embodiment, the resolution module 230 may receive an indication about a modification of the data field. In such a scenario, the resolution module 230 may evaluate the modification to determine if the modification suggests the success or failure of the wager. In other embodiment, the resolution module 230 may initiate or have access to a background process at predetermined times for all wagers to determine if the associate data fields indicate the success or failure of the wager. Other techniques for resolving the wager may be provided.

If the evaluation condition is satisfied, the resolution module 230 then compares the current value of the data field to the predicted value in the completed wager. If the first user correctly predicted the data field, the resolution module 230 declares the first user the "winning party" and the second user the "losing party," or vice versa. The resolution module 230 may further initiate crediting the winning party and debiting the losing party in accordance with the wager amount.

The account module 240 maintains wager accounts of one or more of the community members that represent the running amount of current points accumulated by the users as a result of wagering activities. For example, the account module 240 may maintain the wager accounts of the first and second users discussed above. Upon receipt of the resolved wager, the account module 240 may update the accounts, e.g., by crediting the wager account of the winning party and debiting the wager account of the losing party. The account module 240 may also provide wager account information, such as running total and account history, for display to one or more members of the community. As an example, the account module 240 may generate a leaderboard displaying the users with the most successful wagers.

The data analytics module 250 may receive information about the first user, the second user, the proposed wager, and the completed wager, including the evaluation condition, the predicted value, and the wager amount. The data analytics module 250 considers this information with similar types of information about other proposed and completed wagers to generate further information about the data object, the users, or the overall community. For example, the data analytics module 250 may use aggregated information to generate a forecast about the future values of the data field. Additionally, this information may provide insight about community opinion or particularly skilled or knowledgeable users. In particular, the data analytics module 250 may generate insight into the "true" value of the data field, and in response, adjust the current value in view of the predicted values or determine a confidence level in the accuracy of the current value.

The "true" value of the data field may be aggregated from the wagers in a number of ways. For example, the data analytics module 250 may use an average of the wagers for numerical wagers, and the average may be weighted based on the authority or importance of the users, including weighs based on number of points wagered, previous bet history, number of newsfeed followers, etc. For text-based wagers, the data analytics module 250 may be the most commonly wagered text value, which may or may not be normalized prior to evaluation. Other uses of the data from resolved wagers are discussed below.

Now that the valuation system 200 has been introduced, further details about the implementation of the valuation system 200 will be provided. As examples, FIGS. 3-9 provide various examples of an implementation of the valuation system 200 of FIG. 2.

Figure 3:
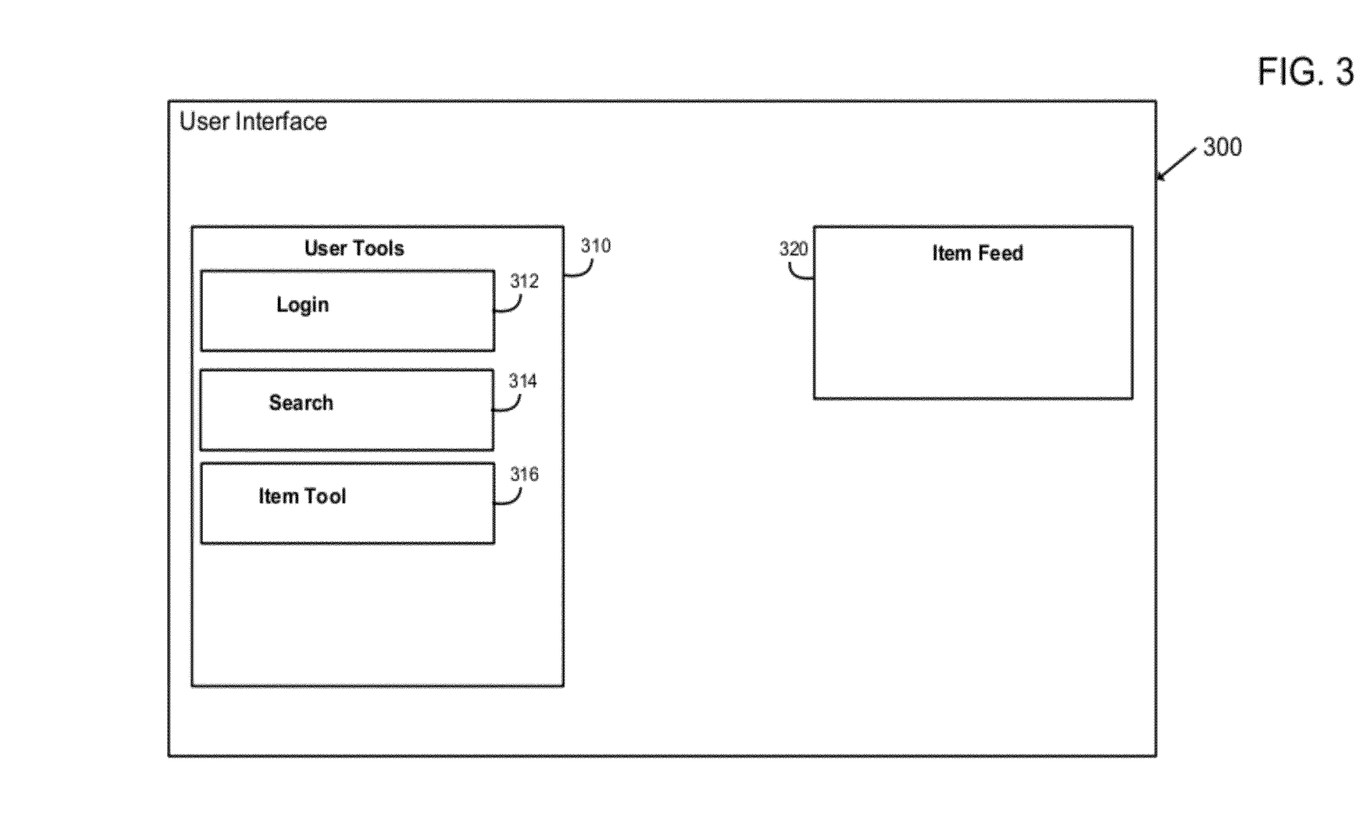
FIG. 3 is a block diagram of an exemplary user interface used by valuation system of FIG. 2 in accordance with an exemplary embodiment.

FIG. 3 is a block diagram of an exemplary user interface 300 associated with the valuation system 200 and which may also be implemented in the system 100 of FIG. 1. In one exemplary embodiment, the user interface 300 (e.g., a graphical user interface) may be a website or other web document viewed on a browser that enables a user to interact with other members of the community (e.g., community 150 or 152 of FIG. 1). In other embodiments, the user interface 300 may an internal system, such as a company intranet, or other applications that may be connected to the network 145 that are not displayed in a browser. As an example, the user interface 300 may be used with a customer relationship management (CRM) application, service or system, e.g., a system that may track sales activity, progression of potential sales deals, sales team quotas, and the like within the community. As another example, the user interface 300 may be used with other types of collaborative platforms, e.g., platforms that enable interaction between coworkers or community members.

As such, the user interface 300 may include user tools 310, such as a login interface 312, a search tool 314, an item tool 316, and a viewing tool 318. In general, the user tools 310 are a set of links that initiate a set of instructions that cause a set of operations to be performed. As examples, the login interface 312 is a group of fields presented to the user within which the user enters a password and/or a user name in order to gain entry. The search tool 314 includes a field in which the user may enter a search term to find content within user interface 300 or database 130 (FIG. 1). The item tools 316 are a set of links that enable users to post, view, and comment on information of interest to individual users, groups of users, or the entire community. The items posted by the user or other users of the community are posted in an item feed 320. As described below, such items are typically associated with at least one data object stored in the database 130 (FIG. 1). The item tools 316 may also enable the user to interact with at least a portion of the valuation system 200 (FIG. 2) discussed above. For example, the item tools 316 may further enable users to create proposed wagers and counter-wagers and to view current and past wagers and wager account information. Although not shown, the user interface 300 may include other dynamic and static content and/or may not have all of the elements illustrated.

Figure 4:
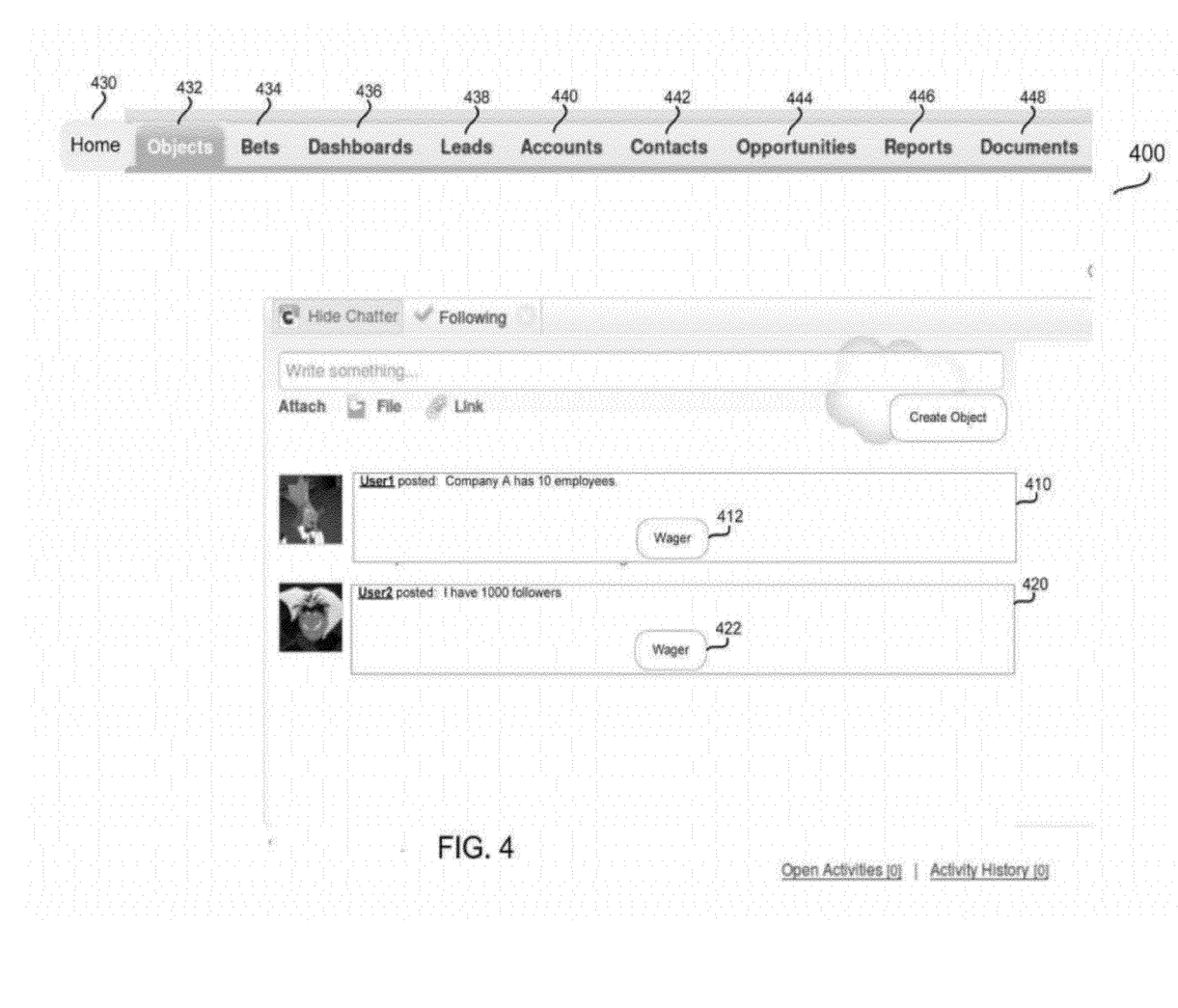
FIG. 4 is a first example of a display generated by the valuation system of FIG. 2 on the user interface of FIG. 3 in accordance with an exemplary embodiment.

FIG. 4 is a first example of a display (or screenshot) 400 generated by the valuation system 200 of FIG. 2 on the user interface 300 of FIG. 3 in accordance with an exemplary embodiment. As described above in reference to FIG. 1, information that forms the display 400 is generated by the tenant application 128 accessible via network 145 by the user devices 140 and 142, e.g., as an interactive webpage. The display 400 generally includes visual representations of items 410 and 420, such as links, reports, comments, and other postings that may be of interest to the user. In the example of FIG. 4, the display 400 displays items 410 and 420 that reference one or more data objects. As described above, the subject data objects may correspond to the data objects stored in database 130 (FIG. 1). Additionally, the display 400 includes a number of tabs or links that enable interaction with the valuation system 200, including tabs representing home 430, objects 432, bets 434, dashboards 436, leads 438, accounts 440, contacts 442, opportunities 444, reports 446, and documents 448 that may be of interest to the user.

In general, the user interface 300 (FIG. 3) may structure the display 400 in the form of, for example, a news feed or other form of social network in which users of the community may interact with one another by posting and commenting on information items (e.g., items 410 and 420). Items 410 and 420 may be generated for a particular user, e.g., as a new feed that displays shows data objects of interest to the user, posts by that user, posts by user users to that user, posts where that user is mentioned, posts to groups the user is a part of, auto-generated posts produced by actions the user took, etc.

As introduced above, the display 400 also enables the user to initiate the valuation system 200 (FIG. 2) in reference to the data objects of the items 410 and 420. In particular, in the example of FIG. 4, the display 400 presents at least two ways of interacting with the valuation system 200. The user may initiate the valuation system 200 via the objects link 402 or through an item (e.g., items 410 and 420) on the display 400.

Figure 5:
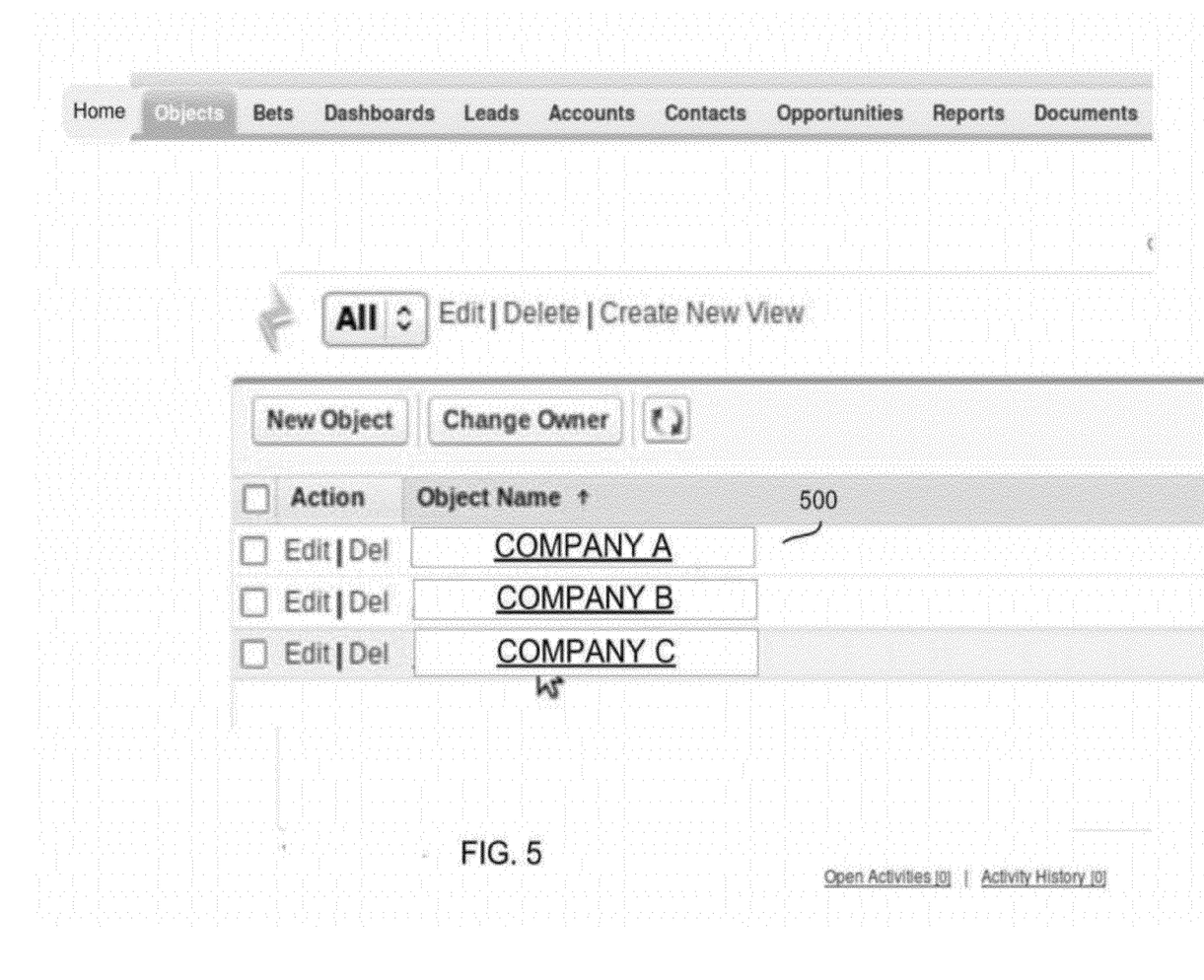
FIG. 5 is a list of data objects associated with the valuation system of FIG. 2 accordance with an exemplary embodiment.
Figure 6:
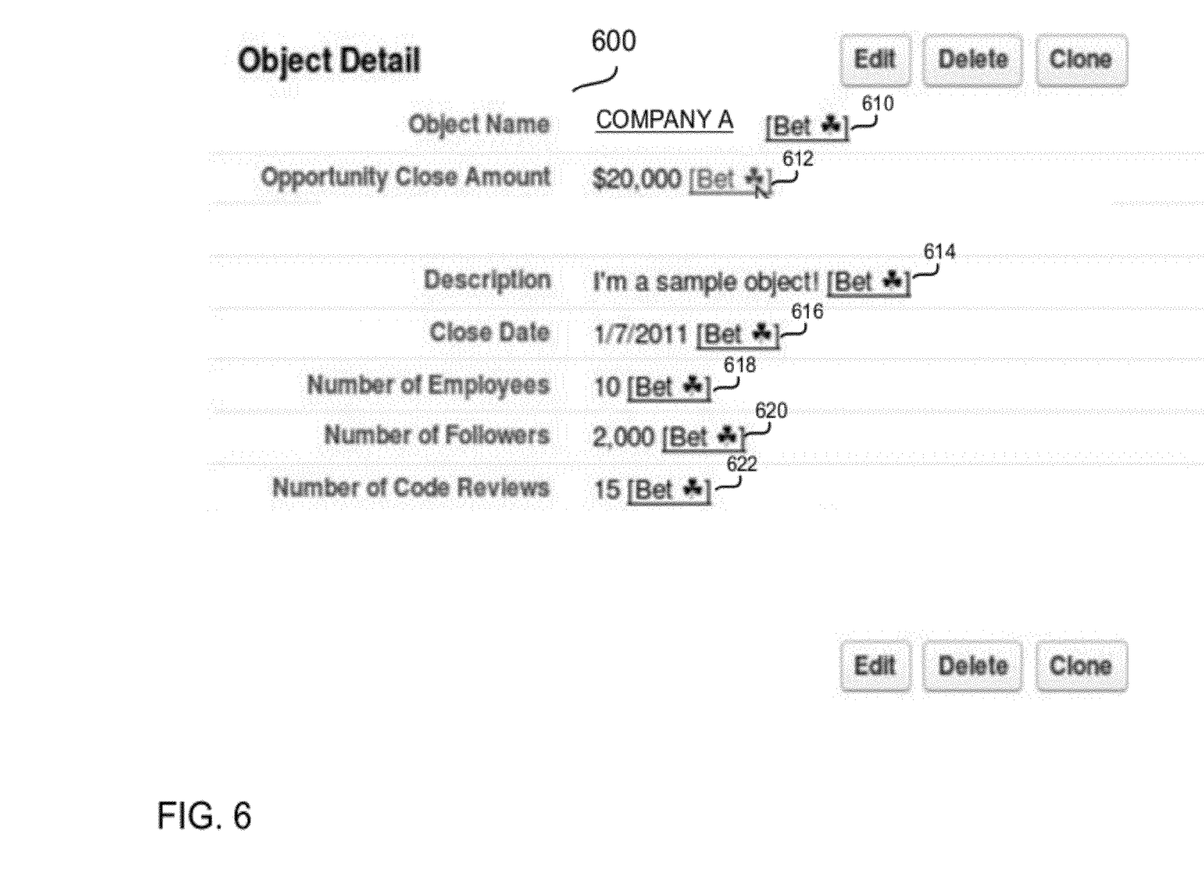
FIG. 6 is a schematic representation of data fields of a data object associated with the valuation system of FIG. 2 accordance with an exemplary embodiment.

As introduced above, the objects link 402 enables a user to view or edit a data object. Reference is briefly made to FIG. 5, which shows an exemplary list 500 of data objects that are displayed upon selecting the objects link 432 in FIG. 4. As noted above, the data objects may be any type of data, but in this example, the data objects are associated with Company A, Company B, and Company C, which may represent information about companies that are of interest to the user or community. In one exemplary embodiment, Company A may be a client or project on which the user is working Upon selection of a data object, details about the data object may be presented to the user. An example of such object detail is presented in FIG. 6, which is schematic representation of the object data fields 600 associated with Company A. In FIG. 6, the object fields 600 include the object name, the opportunity close amount, a description of the object, a close date associated with the object, the number of employees associated with the object, the number of followers of the object, and number of code reviews associated with the object. In general, some of these object fields 600 may not be presented to the user and/or may not be applicable to the object, and additional object details may be provided.

As is particularly shown in FIG. 6, the object details additionally includes a number of wagering links 610, 612, 614, 616, 618, 620, and 622 that enable a user to wager on one or more of the data fields of the data object. Some data fields may not be suitable for wagering, such as the object name, but generally, any data field may be subject to a wager. Upon selection of one of the wagering links 610, 612, 614, 616, 618, 620, and 622, the creation module 210 of the valuation system 200 may generate a prediction entry interface for any data field associated with the data object of the selected item 410.

In addition to navigating through individual data objects as presented in FIGS. 5 and 6, the user may also select a data object presented on the display 400 of FIG. 4. For example, referring again to FIG. 4, the item 410 represents one or more data fields associated with the data object of Company A, e.g., particularly the data field that represents the number of employees of Company A. In the example of FIG. 4, the user selects (e.g., clicks on) wager selection 412 to create a wager with respect to the data object of item 410. Upon selection of the wager selection 412, the creation module 210 of the valuation system 200 may generate a prediction entry interface for any data field associated with the data object of the selected item 410.

Figure 7:
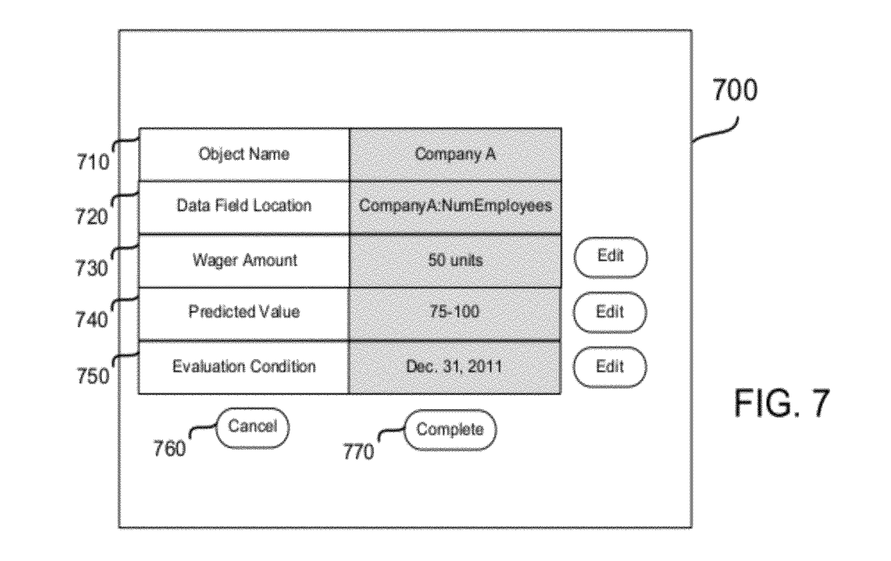
FIG. 7 is a prediction entry interface for the valuation system of FIG. 2 in accordance with an exemplary embodiment.

Reference is briefly made to FIG. 7, which is a prediction entry interface 500 for the wager selection 412 of the item 410 of FIG. 4 or the wager selection 618 of FIG. 6 in accordance with an exemplary embodiment. As noted above, the item 410 and/or wager selection 618 represent the data object of Company A and the data field corresponding to the number of employees, e.g., 10 current employees in this example. As such, the prediction entry interface 700 includes a user interface that displays the object name 710, the data field location 720, the wager amount 730, the predicted value 740, and the evaluation condition 730. In this embodiment, the wager amount 730, the predicted value 740, and the evaluation condition 750 may be edited by the user in the prediction entry interface 700.

In the example of FIG. 7, the data field location 720 is generated by the creation module 210 as "CompanyA:NumEmployees" to specify the location of the data field being predicted. As noted above, when selected, the wagering link associated with a data field passes along information about the fields as a link parameter (e.g., a URL parameter), such as the unique ID of the data object and the name of the field.

In this example, the predicted value 740 predicted by the user is 75 to 100 employees, and the evaluation condition 750 is the date of Dec. 31, 2011. The prediction entry interface 700 further includes a cancel selection 760 and a complete selection 770 to respectively cancel and complete the proposed wager. Although not shown, the creation module 210 may invoke constraints on the prediction entry interface 700, including maximum or minimum predicted values, maximum or minimum resolution dates, maximum or minimum wager amounts, and wager authorization based on the identity of the user. Upon cancellation of the prediction entry interface 700, the valuation system 200 returns to display 400 such as that displayed in FIG. 4. Upon completion of the proposed wager in the prediction entry interface 700, the valuation system 200 stores the proposed wager and may display the proposed wager, as shown in FIG. 8.

Figure 8:
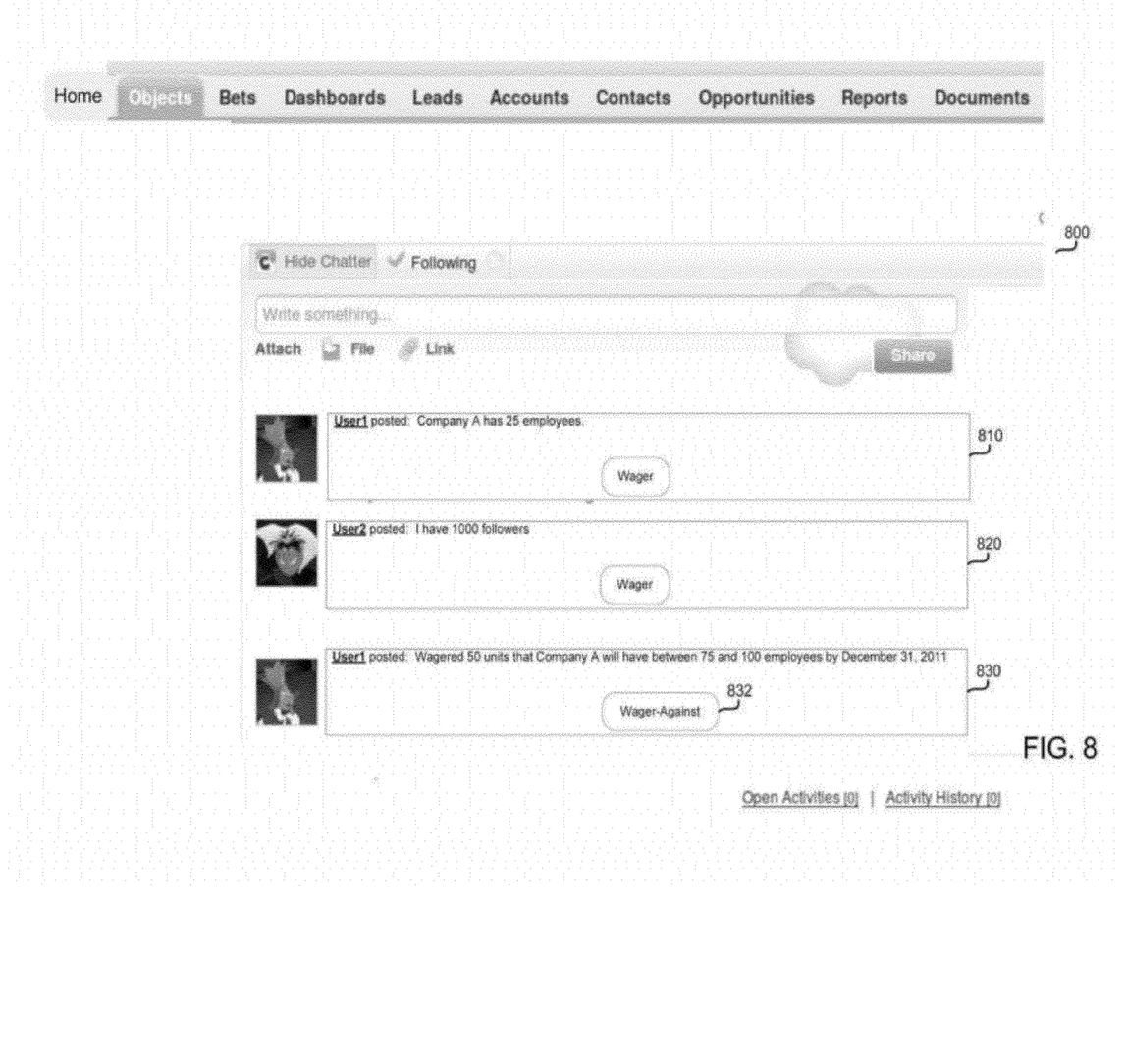
FIG. 8 is a second example of a display generated by the valuation system of FIG. 2 on the user interface of FIG. 3 in accordance with an exemplary embodiment.

FIG. 8 is a second example of a display 800 generated by the valuation system 200 of FIG. 2 on the user interface 300 of FIG. 3 in accordance with an exemplary embodiment. The display 800 of FIG. 8 generally corresponds to the display 400 of FIG. 4, such as displaying items 810 and 820 similar to items 410 and 420 discussed above. However, the display 800 further includes item 830 that represents the proposed wager created in by the creation module 210 of valuation system 200 (FIG. 2) and discussed in reference to FIG. 7. For example, item 830 displays that a first user (User 1) wagered 50 units that Company A will have between 75 and 100 employees by Dec. 31, 2011. In addition to information about the proposed wager, the item 830 has a wager-against selection 832 that enables another user (e.g., a counter-party) to accept the proposed wager.

Upon selection of the wager-against selection 832, the counter-party module 220 (FIG. 2) completes the wager, and optionally, displays the completed wager. As described above, the valuation system 200 (FIG. 2) monitors the evaluation condition, evaluates the data field when the evaluation condition is satisfied, determines the winning party of the wager, and credits and debits the appropriate wager accounts of the user and counter-party.

Figure 9:
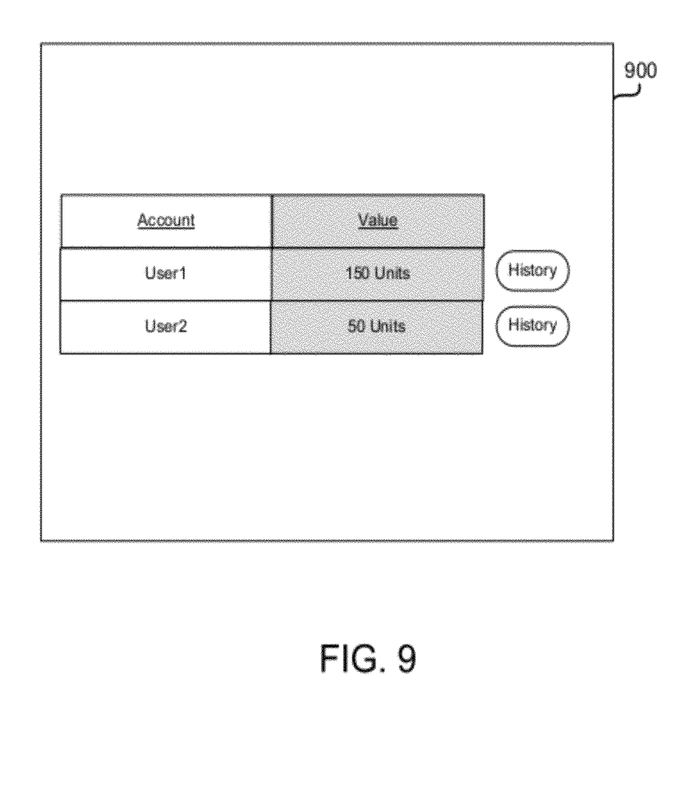
FIG. 9 is an account status display generated by the valuation system of FIG. 2 in accordance with an exemplary embodiment.

FIG. 9 is an account status display 900 generated by the valuation system 200 of FIG. 2 in accordance with an exemplary embodiment. As discussed above, the account status display 900 may display the respective amounts in the accounts of the first and second users (e.g., User1 and User2, respectfully). In the example discussed herein, both users initially had 100 credits in the respective accounts, and 50 credits were transferred from first user to the second user after second user successfully predicted the number of employees of Company A and won the wager.

FIGS. 4-9 were discussed with reference to the prediction about the number of employees of Company A. In general, the gaming aspect of the wager encourages user interaction in the system 100, particularly about a topic that may otherwise not be of interest to the users. However, the wager, especially when considered with similar wagers, may provide additional information. As examples, the wagers provide an indication about what the number of employees of Company A should be or the general perceptions about Company A. The wagers further provide an indication about the value of the data field to the users of the community, e.g., about the level of interest in Company A or the number of employees.

Another example of a data field value that may be suitable for a wager is the anticipated value of a predicted sale. Again, such information gathered from aggregated wagers may provide an indication about what the value should be and user opinion about the sale. A further example is a prediction about how many hours it will take another user to complete a project or the predicted amount of work necessary for a particular project. Such wagers may provide information about high or low performing employees or forecasts about current projects as a result of the aggregated peer feedback illustrated by the wagers. The wagers provide information about the importance, correctness, and preference for the various posed items. In general, exemplary embodiments enable a tenant to generate more accurate data values, user feedback and interaction, and information about the users.

Figure 10:
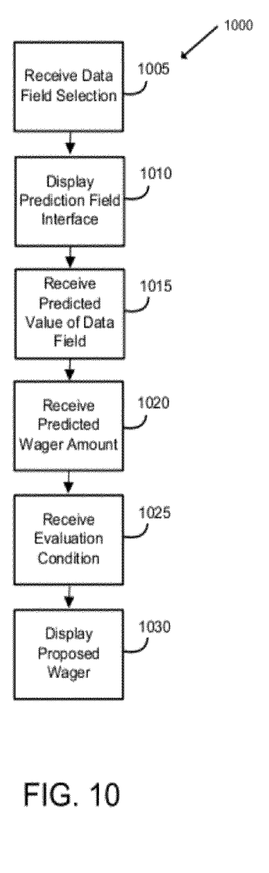
FIG. 10 is a flow chart of a method for proposing a wager in accordance with an exemplary embodiment.
Figure 11:
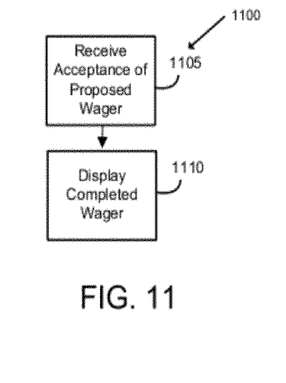
FIG. 11 is a flow chart of a method for completing a wager in accordance with an exemplary embodiment.
Figure 12:
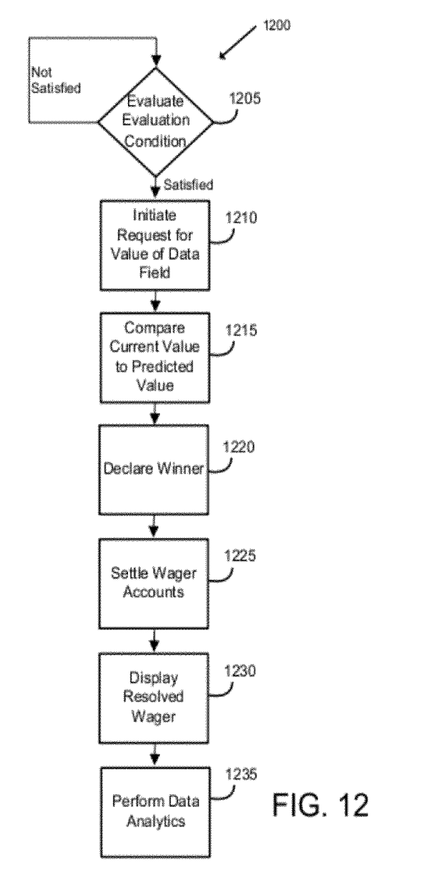
FIG. 12 is a flow chart of a method for resolving a wager in accordance with an exemplary embodiment.

FIGS. 10-12 are flow charts of methods that may be implemented with the valuation system 200 and system 100 discussed above. As such, FIGS. 10-12 are discussed with reference to FIGS. 1-9.

In particular, FIG. 10 depicts a method 1000 for proposing a wager in accordance with an exemplary embodiment. As described above, the method 1000 may be implemented in the context of the display 400 presented in FIG. 4 and provided by the system 100. In a first step 1005, a first user selects a data field, e.g., a data field associated with a data object displayed to the user. In a second step 1010, the valuation system 200 may display a prediction entry interface to the user. In step 1015-1025, the valuation system 200 receives a prediction about the future value of the data field (step 1015), a wagered amount of points (step 1020), and a evaluation condition (step 1025). In step 1030, the valuation system 200 stores the proposed wager, and in step 1035, the valuation system 200 displays the proposed wager to other users of the community.

FIG. 11 is a flow chart of a method 1100 for completing a wager in accordance with an exemplary embodiment. As described above, the method 1100 may be implemented in the context of the display 400 presented in FIG. 4 and provided by the system 100. For example, the method 1100 may follow the method 1000 of FIG. 10 in which a proposed wager is being displayed to a second user. In a first step 1105 of the method 1100, the valuation system 200 receives an acceptance of the proposed wager from the second user (e.g., a "counter-party") to form a completed wager. In a second step 1110, the valuation system 200 displays the completed wager to the users of the community.

FIG. 12 is a flow chart of a method 1200 for resolving a wager in accordance with an exemplary embodiment. As described above, the method 1200 may be implemented in the context of the display 400 presented in FIG. 4 and provided by the system 100. For example, the method 1200 may follow the method 1100 of FIG. 11 in which a wager has been completed between the first and second users. In a first step 1205, the valuation system 200 evaluates the evaluation condition associated with the completed wager. Upon satisfaction of the evaluation condition, the method 1200 proceeds to step 1210 and the valuation system 200 initiates a data request for the current value of the data field. Upon receipt, the method 1200 proceeds to step 1215 in which the valuation system 200 compares the current value to predicted value in the completed wager. In step 1220, the valuation system 200 declares a winner of the wager based on the comparison. In step 1225, the valuation system 200 settles the wager accounts of the first and second users, and in step 1230, the valuation system 200 may display the resolved wager and/or the resulting wager accounts. In step 1230, the valuation system 200 may perform data analytics on the proposed wager, the completed wager, the resolved wager, and similar wagers to provide additional information about the value of the data field and the users of the community.

Accordingly, the systems 100 and 200 and methods 1000, 1100, and 1200 provide an optimized platform for sharing information, increasing user interaction, and improving data analytics. As mentioned above, various functions shown in FIGS. 2-12 may be implemented using software or firmware logic that is stored as part of the application server 102 and database 130 of FIG. 1. The particular hardware, software and/or firmware logic that implements any of the various functions may vary from context to context, implementation to implementation, and embodiment to embodiment. As noted above, while embodiments are useful in a variety of configurations and applications, an example application in which a website is provided in conjunction with an on-demand multi-tenant database service has been used to illustrate, but not limit, the many features and benefits provided by embodiments. A multi-tenant database service is not required, however.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium, which may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented valuation method for a data field of a data object, the method comprising the steps of:
   receiving a proposed wager from a first user comprising a predicted future value of the data field at an evaluation condition;
   receiving a counter-wager from a second user against the predicted future value;
   monitoring the evaluation condition;
   upon satisfaction of the evaluation condition,
      determining a current value of the data field,
      comparing the current value to the predicted future value, and
      declaring a winning party between the first user and the second user based on the comparison; and
      displaying the data object associated with the data field on a news feed, and wherein the step of receiving the proposed wager includes receiving the proposed wager via the news feed.

2. The method of claim 1, further comprising evaluating the current value of the data field based on the predicted future value.

3. The method of claim 1, wherein the determining step includes retrieving the current value from a multi-tenant database.

4. The method of claim 1, wherein the step of receiving the proposed wager includes receiving a data object selection on a website.

5. The method of claim 1, wherein the step of receiving the proposed wager includes receiving the predicted future value and the evaluation condition on a prediction entry interface.

6. The method of claim 1, further comprising displaying the proposed wager to the second user.

7. The method of claim 1, further comprising displaying the proposed wager in the news feed.

8. The method of claim 1, wherein the further comprising the step of generating a confidence level associated with the current value based on the predicted future value.

9. The method of claim 1, wherein the step of receiving the proposed wager includes receiving a wager amount.

10. The method of claim 1, further comprising the step of crediting a user account of the winning party with the wager amount.

11. A multi-tenant data processing system, comprising:
   a database that stores data specific to each one of a plurality of tenants such that at least two of the tenants store at least a portion of data specific to the at least two tenants in a common structure within the database, wherein each tenant is permitted access only to data associated with the respective tenant, the data including data objects with one or more data fields; and an application server coupled to the database and configured to:

receive a proposed wager from a first user comprising a predicted future value of a first data field and a evaluation condition, monitor the evaluation condition, and when the evaluation condition is satisfied, retrieve a current value of the data field from the database, compare the current value to the predicted future value, and declare the first user a winning party or a losing party based on the comparison.

12. The system of claim 11, wherein the application server is further configured to evaluate the current value of the data field based on the predicted future value.

13. The system of claim 11, wherein the application server is further configured to generate a prediction entry interface for entry of the predicted future value and the evaluation condition.

14. The system of claim 11, wherein the application server is further configured to display the proposed wager to the second user.

15. The system of claim 11, wherein the application server is further configured to display a news feed with the data object for creation of the proposed wager.

16. The system of claim 11, wherein the application server is further configured to receive a wager amount.

17. The system of claim 16, wherein the application server is further configured to credit a user account of the winning party with the wager amount.

18. The method of claim 7, wherein the step of receiving the proposed wager includes receiving the proposed wager in response to a user selection of the data object displayed in the news feed.

19. The system of claim 14, wherein the first data field is associated with a first data object from a first tenant of the plurality of tenants, and wherein the first user and the second user are members of the first tenant.

\* \* \* \* \*